Nov. 29, 1938.　　　C. S. JOHNSON　　　2,138,172
BATCHING APPARATUS
Filed Feb. 10, 1937　　　3 Sheets-Sheet 1

Inventor
CHARLES S. JOHNSON.
By Robb & Robb
Attorneys

Nov. 29, 1938.  C. S. JOHNSON  2,138,172
BATCHING APPARATUS
Filed Feb. 10, 1937  3 Sheets-Sheet 2

CHARLES S. JOHNSON.
By Robert Cobb
Attorneys

Nov. 29, 1938.    C. S. JOHNSON    2,138,172
BATCHING APPARATUS
Filed Feb. 10, 1937    3 Sheets—Sheet 3

Inventor
CHARLES S. JOHNSON.
By Robb & Robb
Attorneys

Patented Nov. 29, 1938

2,138,172

UNITED STATES PATENT OFFICE 2,138,172

BATCHING APPARATUS

Charles S. Johnson, Champaign, Ill., assignor to The C. S. Johnson Company, Champaign, Ill., a corporation Application February 10, 1937, Serial No. 125,167

6 Claims. (Cl. 259—168)

This invention comprises an improved method and apparatus for batching aggregates, particularly aggregates that make up concrete batches for mixing, though the invention is susceptible of use in any connection where a number of different kinds of aggregate materials are to be proportioned, certain of which require separate or independent weighing and all subsequently intermingled.

One of the main features of the invention resides in improving the type of batch discharging means set forth in my Letters Patent No. 1,687,499 issued October 16, 1928, said means involving provisions whereby an aggregate material such as cement may be coordinately fed through a hopper to which is supplied other aggregate materials and as the entire batch of materials passes to a mixer or other point of treatment or use thereof.

In carrying out the present invention, the various aggregate materials are measured by weight since the specifications for the use of such materials usually require this method of measuring. The apparatus of this invention makes provision for a batch hopper assembly that comprises a main aggregates hopper in which the larger aggregates such as sand, fine rock, and coarse rock, may be weighed. Associated with the main aggregates hopper, according to the invention, is an auxiliary cement weighing hopper, and since both of the said weighing hoppers are intended to be combined in one machine but each suspended by independent weighing instrumentalities such as the weigh beams and lever systems of scales, the invention makes special provision for the assembly of the cement hopper within a compartment formed in the main aggregates hopper, the arrangement of the two hoppers being such that each of them is susceptible of up and down movement in order that the weighing operations of the contents of each hopper may be separately effected. In other words, practically speaking, the cement hopper and the main hopper for the other aggregates to be commingled with the cement are separately suspended from the respective scale means employed therefor and are independently movable in the independent weighing operations to be performed for the contents of each hopper.

It is always desirable, where possible, in respect to the combining of the various aggregates for the concrete batch, to intermingle the larger aggregates and the cement to effect overall shrinkage previous to introducing the same into ordinary mixing machines or truck mixers, and this method of procedure has proven quite essential in order to avail of the full volumetric capacity of the truck mixers especially. The intermingling of the various aggregate materials, including the cement, in the manner stated, effects pre-shrinkage of the over-all volume of materials by placing the "fines" in the "voids" of the coarser aggregates, reduces the "gumming" in the mixers by reducing the direct cement and wet shell contact, and promotes a more thorough mixing action as well as one which may be performed more quickly after the aggregates reach the mixer, whatever type it may be.

It is thus desirable in the concrete mixing art to which the invention relates that effective intermingling of concrete aggregate materials be obtained before they enter mixers. It is also desirable that there be employed a method and batching system or apparatus affording a simple and direct method of gravitating the materials, such as cement and separate larger aggregates independently measured, into an intermingled condition as they progress to the outflow point or discharge of a mixer charging apparatus. The outlined method of gravitational measured batching of materials is distinct from the common method of supplying such materials to a mixer and performing the main mixing operation in the latter.

In the carrying out of the present invention the batching apparatus hereof may be said to incorporate to a certain extent, but in an improved and controlled manner, a portion of the gravitational action of the gravitative type of mixer, incorporating such action into the bathing apparatus by the employment of the special type of batching hoppers, herein described. Under the use of the invention, a certain amount of improvement by pre-mixing or intermingling of the materials is effected after they are batched and before they ever reach the mixing apparatus proper in which the final mixing operation is to be performed.

Another feature of the invention resides in novel water supply and pre-mixing means especially designed to prevent gumming of the materials before discharged into the final mixer.

Respecting the so-called pre-mixing or intermingling phase of action of the separate aggregate materials, subsequent to their batching, and prior to passing on to final mixing instrumentalities or other place of reception or deposit, the invention deals with another practical problem incident to apparatus of this type.

Since the aggregate materials are composed of sluggish flowing finer materials or substances, such as sand or gravel, and fast flowing heavy materials such as fine rock and heavy or larger rock particles, there is a tendency on the part of said heavier materials flowing at higher velocity to a common point of intermingling, to cut off or retard the flow of the finer materials by an intercepting action in respect to the latter. Therefore, the invention involves certain improved baffle means located adjacent to the discharge portion of the main hopper, at which the streams of discharging finer and heavier aggregates meet and commingle, for preventing the heavier materials flowing directly across the path of movement of the gravitating finer materials from retarding and partially cutting off the flow of said finer materials. In this way the flows of the several finer and heavier aggregates are prevented from interfering with one another and especially the flow of the finer materials is controlled and deflected in such a way that said heavier materials will not intercept and check or retard the flowing action of the finer aggregates. Thus, I am enabled to obtain in this way a controlled, substantially even flow of the various finer and heavier aggregates at the discharging portion of a hopper or hoppers at which the aggregates are caused to meet for commingling as they issue from said discharge portion. By the means just referred to, insuring the uniformity of flowing of the several commingling aggregate materials, the homogeneousness of the premixed materials is substantially increased as a step of their preparation for subsequent mixing or other treatment.

As a subsidiary feature of the invention, there is provided intermediate the discharge portion of the cement hopper and the adjacent portion of the main hopper in which it is movably mounted, a flexible shroud or apron carried by the cement hopper and having contact with the main hopper at points adjacent to the cement hopper discharge, the said shroud or apron being an effective means for sealing off the dust usually rising as an incident to the discharge of cement from any receptacle, and from blowing and filling the air while the cement batcher is discharging its contents into and through the aggregate batcher to pass on to the mixer or other place of reception for the combined or batched aggregates.

In the accompanying drawings—

Figure 5 is a horizontal sectional view taken about on the line 5—5 of Figure 1.

Figure 1:
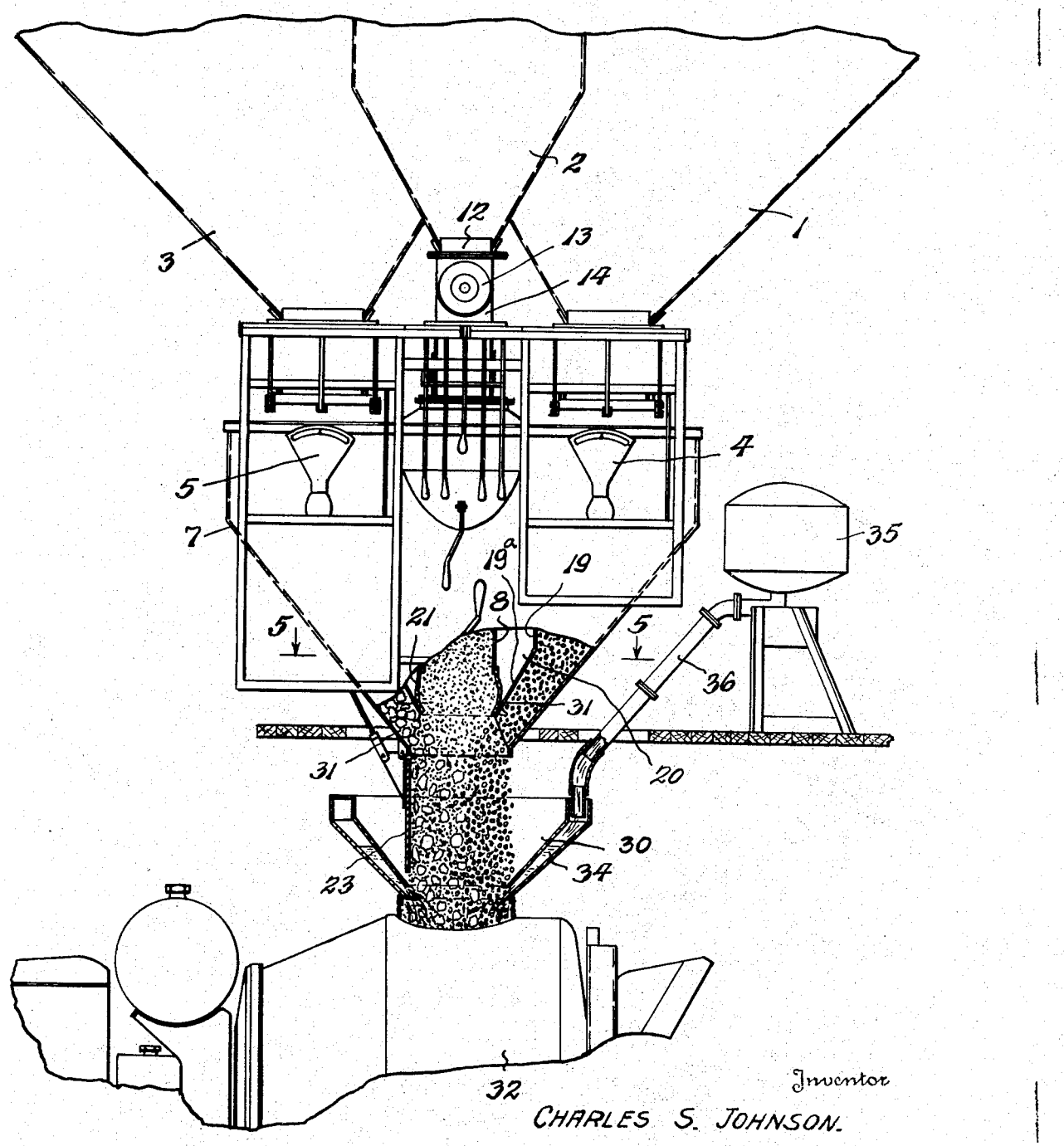
Figure 1 is a general view in elevation and partly broken away, to show certain features in section, of a batching apparatus embodying the invention, a portion of a truck mixer being illustrated as receiving the batched materials.
Figure 2:
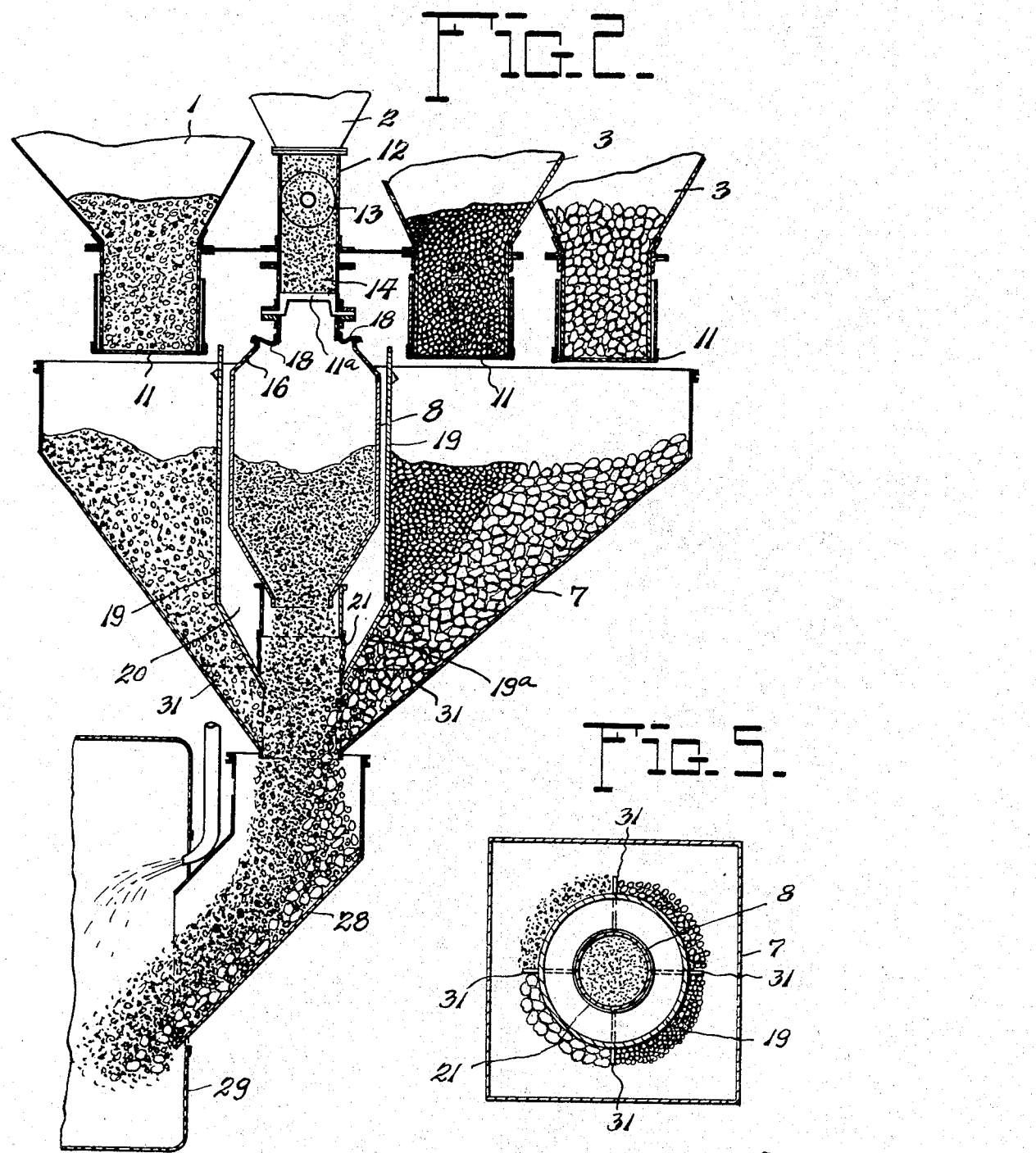
Figure 2 is a vertical sectional view through the discharge portions of the supply bins and the main and auxiliary hoppers, also the charging chute of a stationary mixer, bringing out clearly the relative mounting of the hoppers.

Referring to the drawings, especially Figure 1, it is noted that the apparatus involving the invention may comprise a plurality of supply bins, as including the bin 1 for sand, the bin 2 for cement, and the bin 3 for larger aggregate such as rock. There may be two of the bins 3 for the rock aggregate because it is desirable usually that the apparatus be equipped with means to supply coarse rock and fine rock, and Figure 2 shows two such bins 3, one of the bins not being seen in Figure 1. There are provided weighing mechanisms, one designated 4, for the cement, and the other designated 5, for one or more coarser aggregates which may be weighed separately on one scale and separately from the cement.

Figures 3, 4:
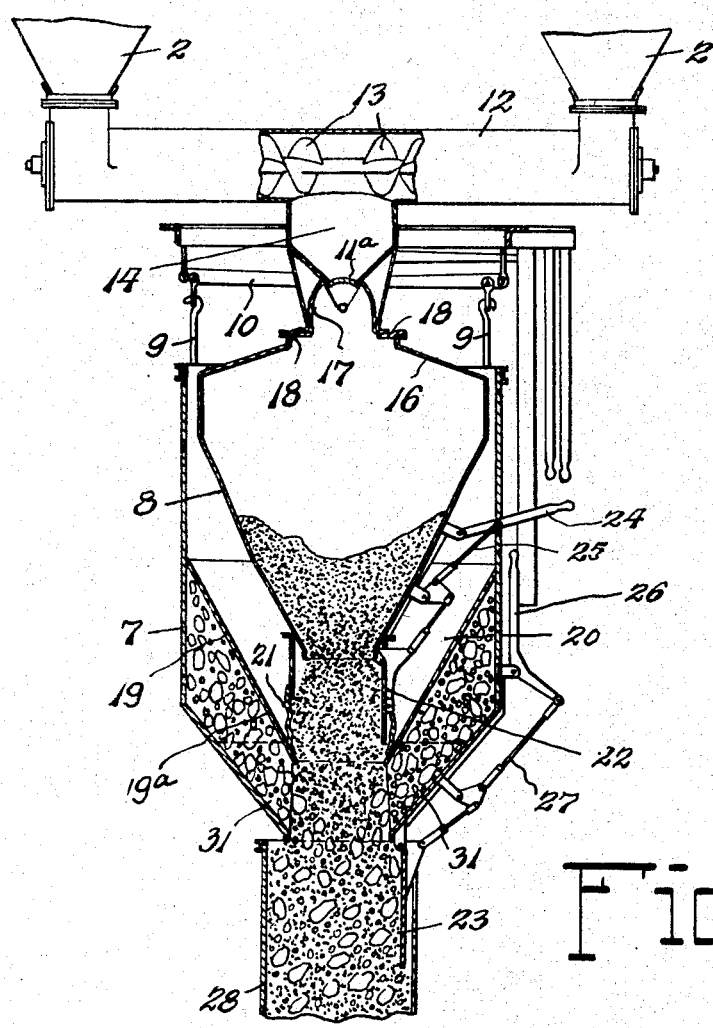
Figure 3 is a sectional view of the batching hoppers, the section being taken at a right angle to that of Figure 2.
Figure 4 is a fragmentary sectional view of the discharge portions of the two hoppers, with the gates of both hoppers closed as distinguished from the condition illustrated in Figures 1, 2, and 3.

The weighing mechanisms 4 and 5 may each be functionally of conventional type such as is used commonly in the art to which the invention relates, but each must include suitable separate scale beams systems, one set for supporting the main aggregates hopper 7 and another set for supporting the cement hopper 8. In Figure 3 the aggregate scale lever devices 10 are connected by the hanger rods 9 to the aggregate hopper 7. The corresponding devices and hanger rods for supporting the cement hopper 8 are not shown in Figure 3.

As seen best in Figures 2 and 3, the supply bins 1 and 3 are equipped with suitable gates 11 that control the passage of the sand and fine and coarse rock aggregates to the main hopper 7. The operating means for these valves or gates 11 may be of any suitable type. The cement may be supplied from one or more bins such as designated 2 and previously referred to, see Figure 3, to a conduit 12 in which are mounted screw conveyors 13 that carry the cement into the discharge portion 14 for said cement bin, said discharge controlled by the valve or gate 11a, see Figure 3. The cement discharge 14 is connected to the upper closed portion 16 of the cement hopper 8 by the metal hood 17 and the flexible apron 18, the latter sealing the connection between the hopper 8 and the hood 17 so as to prevent escape of cement dust, in an obvious manner.

As seen best in Figure 2, the main hopper 7 is equipped with partition means 19 creating a rigid walled compartment 20 therein. In this compartment and with its walls spaced from the walls 19 is disposed the cement hopper 8, previously mentioned, the spacing being such that the hopper 8 is free to move relatively to the hopper 7, and the hopper 7 is entirely free to move relatively to the hopper 8. By this construction independent weighing operations of the respective hoppers 7 and 8, by means of their scale mechanisms 5 and 4, respectively, may be performed. The lower end of the compartment walls 19 converge as seen at 19a, so that they provide a discharge opening above the discharge opening at the bottom of the hopper 7. Surrounding the discharge opening at the bottom of the hopper 8 is the flexible apron or shroud 21 which is pendant, secured at its further edge to the hopper 8 adjacent its discharge and adapted at its lower end to contact with the adjacent lower portion 19a of the compartment wall 19, the effect of the discharge of the cement through the shroud or circular apron 21 being to cause its said lower end to seal itself against the portion 19a near the lower extremity of the latter. The discharge portion of the receptacle or hopper 8 is adapted to be closed by any suitable type of valve or gate such as designated 22 in Figure 3. The discharge portion of the hopper 7 is adapted to be closed similarly by any suitable type of valve or gate 23 in Figure 3.

In Figure 3 there is illustrated a manual lever 24 connected by links 25 with the gate or valve 22 of the cement hopper 8. A similar lever 26 is connected by links 27 to the gate 23 of the hopper 7. These devices for operating the respective gates 22 and 23 are conventional and are immaterial to the invention.

Figure 4 shows the valves 22 and 23 closed and also illustrates the arrangement of the flexible shroud or apron 21 that extends between the cement hopper discharge and the main aggregates hopper 7, and which shroud is pressed against the adjacent portions of the latter hopper when the rush of cement in discharging from the hopper 8 takes place.

The operation of the apparatus will be apparent from the foregoing disclosure of the construction. As the cement is fed into its hopper 8, it is measured by weight until the required amount is registered upon the scale mechanism 4. Similarly, the larger aggregates of sand, fine rock, and coarse rock are supplied to the hopper 7 and weighed therein consecutively. The hoppers 7 and 8 are adapted to move up and down independently of each other and of course move downwardly as the materials to be weighed are deposited therein. Said materials, concrete aggregates in this instance, are retained in the hoppers 7 and 8 by the closed discharge gates at the discharge portions of said hoppers. When the discharge gates 22 and 23 are opened it will be apparent that the cement being disposed so as to discharge downwardly between and into the other aggregates of sand, fine rock, and coarse rock, will be intermingled with and fill the "voids" of the latter as the various aggregates pour out of the discharge for the hopper 7, adjacent to the gate 23. This commingled action involves in part the principle of the gravitational mixing method previously referred to herein, and consequently some pre-mixing and shrinkage of the over-all batch, and effects other practical advantages in the employment of the apparatus under conditions of service. The aggregate materials from the discharge controlled by the gate 23 may pass to a charging chute 28 that leads to a stationary concrete mixer 29, as seen in Figure 2, or they may pass to a gathering hopper 30 directing them to the receiving opening of the rotating mixer 32 of a truck mixer type vehicle.

As clearly shown in the drawings, there are located within and adjacent to the discharge portion of the main hopper 7, vertical dividing partitions 31 rigidly fixed to and between the compartment member 20 and the lowermost walls of the hopper 7. The partitions 31 are arranged so as to handle four different aggregate materials, according to the illustration in Figure 5, as for instance large stone running from approximately 1½" to 3" size, smaller stone of ¾" to 1½" grade, gravel ¼" to ¾" grade, and sand. The action of the partitions 31 is to maintain the said materials separated, practically speaking, until they issue from the discharge opening of the hopper 7 which is controlled by the gate 23. The partitions 31 extend transversely relative to the opening at the bottom of the compartment member 20, with which opening the shroud or apron 21 coacts as previously described.

It will be seen that because of the disposition of the partitions 31 vertically and their location in the path of flow movement of the several aggregates above mentioned, they will deflect the flow of the aggregates as they pass through the space between the lower end of the member 7 and the lower end of the member 20, the deflection being from the inclined or angle path of movement to a substantially vertical path of movement. The partitions prevent, therefore, the flow of the heavier aggregate materials such as the large and smaller stone, across the path of the smaller aggregate materials such as the sand and gravel, and thus prevent interception, retarding, or checking of the flow of the smaller aggregates by said larger aggregates. The cement feed may be characterized as central of the surrounding or concentric feeds of the aggregates in the discharge portion of the apparatus between the discharge opening of the hopper 7 and the lower end of the member 20, facilitating the picking up and intermingling of the cement with all of the various aggregates, in an obvious manner.

In Figure 1 the gathering or directing hopper 30 is shown as equipped with a surrounding water supplying chamber 34, to which water of a predetermined quantity or weight is led from a measuring tank or like container 35, wherein the water is measured in any suitable manner, through a conduit 36 to the chamber 34. The chamber or compartment 34 discharges the water in a stream of tubular cross-section surrounding the discharge of the hopper 30, said stream being directed with considerable gravitative force at an angle to the axis of flow of the dry aggregates that pour out of the said hopper discharge to enter the mixer 32 or any suitable receiver. Thus the water to be mixed with the aggregates is not fed to the upper hoppers 7 and 8 or to the dry aggregates therein in the former manner of so doing, which has resulted in gumming up the materials in or on said hoppers. The water, according to the present invention, is not caused to commingle with the dry aggregates as they pass through the measuring or supply hoppers therefor, which interferes with free flow and most accurate measuring, this phase of action of the invention being very advantageous from a practical standpoint as will readily be apparent to those versed in the art. The intermixing of the water and dry aggregates, where brought together, is highly efficient because the precipitated water enters the flowing shaft of dry aggregates from all sides thereof to penetrate and commingle with said dry aggregates.

So far as I am aware, it has not been proposed heretofore to employ the novel method and batching system of the invention which involves the accurate and separate measuring by weight of the cement, and larger aggregates, for the batch to be mixed, supplemented by the intermingling of the cement in the voids of the larger aggregates as the two, namely the cement and larger aggregates, are fed to the mixer with the water. The pre-mixing, creating a pre-shrinkage of the combined materials of the batch thus obtained before entering the mixer, has been found to be of important commercial advantage.

Having thus described my invention, what I claim as new and desire to secure by Letters Patent of the United States, is:

1. In a batching apparatus of the class described, in combination, a main hopper to receive aggregate material, an auxiliary hopper disposed within the main hopper, weighing mechanisms one for each hopper, and means for connecting the hoppers with the weighing mechanism therefor so that each hopper may move independently relatively to the other and the materials contained therein.

2. In a batching apparatus of the class described, in combination, a main hopper to receive aggregate material, an auxiliary hopper disposed within the main hopper, weighing mechanisms one for each hopper, means for connecting the hoppers each with its weighing mechanisms therefor so that the hoppers may move independently relatively to each other and the materials contained therein, the said hoppers being provided with coordinated discharge adjacent to one another arranged for intermingled flow discharge of materials, and a flexible shroud intermediate the discharge of the auxiliary hopper and the discharge portion of the main hopper.

3. A batching apparatus as claimed in claim 2, wherein the said shroud is suspended from the auxiliary hopper adjacent to its discharge portion and has a portion thereof in contacting dust sealing relation to the discharge portion of the main hopper.

4. In a batching apparatus, in combination, an outer main aggregates hopper formed with a partition wall or walls therein providing a compartment, an auxiliary hopper movably disposed in said compartment, discharge means for the main hopper, a discharge controlling the auxiliary hopper to enable a discharge of the contents of the latter into the discharge portion of the main hopper, and means connecting the discharge portion of the auxiliary hopper with the adjacent portion of the main hopper for preventing blowing off of dust from the material in the auxiliary hopper as it passes therefrom except into the discharging material from the main hopper.

5. In a batching apparatus of the class described, a main hopper to receive coarser aggregate material, an auxiliary hopper to receive cement disposed so as to discharge the cement onto and into the coarser aggregate material, discharge means for each of said hoppers, the same being concentrically disposed and serving to produce commingling of the cement and coarser aggregate, means whereby the quantity of the cement in the cement hopper and the quantity of coarser aggregates in the main hopper therefor may be accurately measured independently, means for discharging each of said hoppers to effect the commingling action referred to as the aggregates pass from the hoppers flowing in a shaft-like stream while the hoppers are discharging, and instrumentalities to supply water to the flowing shaft of aggregates in a tubular stream surrounding said aggregates and flowing into same at an angle thereto.

6. The method of batching aggregate materials such as used for making concrete or the like, and comprising finer aggregates and larger heavier aggregates, which includes the step of flowing said aggregates at angles to each other to a common point of discharge, preventing the heavier aggregates from intercepting and retarding the finer flowing aggregates at the said discharge as they issue therefrom, causing cement to meet the flow of all of said finer and heavier aggregates at said point of discharge in a zone relative to which the paths of the flowing finer and heavier aggregates are concentric, and flowing water to the said finer and coarse aggregates in a tubular stream surrounding them and directed to enter said aggregates at an angle thereto.

CHARLES S. JOHNSON.